United States Patent

Cotter

(10) Patent No.: US 7,559,542 B2
(45) Date of Patent: Jul. 14, 2009

(54) LOW IMPACT GAS SPRING

(75) Inventor: Jonathan P. Cotter, Dearborn, MI (US)

(73) Assignee: Diebolt International, Inc., Plymouth, MI (US)

( * ) Notice: Subject to any disclaimer, the term of this patent is extended or adjusted under 35 U.S.C. 154(b) by 218 days.

(21) Appl. No.: 11/112,645

(22) Filed: Apr. 22, 2005

(65) Prior Publication Data

US 2006/0055093 A1    Mar. 16, 2006

Related U.S. Application Data

(60) Provisional application No. 60/602,777, filed on Aug. 19, 2004.

(51) Int. Cl.
*F16F 5/00*      (2006.01)

(52) U.S. Cl. .............. 267/64.11; 267/64.19; 267/64.28; 267/118; 267/226; 188/322.19; 188/322.21; 188/322.22; 188/322.17

(58) Field of Classification Search .............. 267/195, 267/217, 226, 64.11, 64.15, 64.16, 64.28, 267/118, 64.19, 64.23; 188/322.19, 322.21, 188/322.22, 322.17, 284
See application file for complete search history.

(56) References Cited

U.S. PATENT DOCUMENTS

| | | | |
|---|---|---|---|
| 2,642,845 A | 6/1953 | Stevens | |
| 4,030,716 A * | 6/1977 | Freitag | 267/64.11 |
| 4,221,367 A * | 9/1980 | Smith | 267/64.15 |
| 4,527,674 A | 7/1985 | Mourray et al. | |
| 5,303,906 A | 4/1994 | Cotter et al. | |
| 5,531,299 A * | 7/1996 | Bataille | 188/322.17 |
| 5,823,513 A | 10/1998 | Stenquist | |
| 6,003,848 A * | 12/1999 | Cotter et al. | 267/64.11 |
| 6,170,809 B1 | 1/2001 | Cotter | |
| 6,199,708 B1 * | 3/2001 | Monaco | 213/43 |
| 6,491,143 B1 * | 12/2002 | Stenquist | 188/269 |

* cited by examiner

*Primary Examiner*—Robert A. Siconolfi
*Assistant Examiner*—James K Hsiao
(74) *Attorney, Agent, or Firm*—Reising, Ethington, Barnes, Kisselle, P.C.

(57) ABSTRACT

A gas spring for providing a smooth and generally gradual load distribution between interrelated parts of a press has a casing defining at least in part a gas chamber. A housing is received at least in part in the casing. The housing has a through bore sized for receipt of the piston rod therein for reciprocation between extended and retracted positions. A piston retainer is attached for conjoint movement with the piston rod. An end of the housing flexes between a compressed position when the piston retainer abuts the housing as the piston rod moves toward its extended position and an uncompressed position when the piston retainer moves toward its retracted position and out of engagement with the housing.

24 Claims, 4 Drawing Sheets

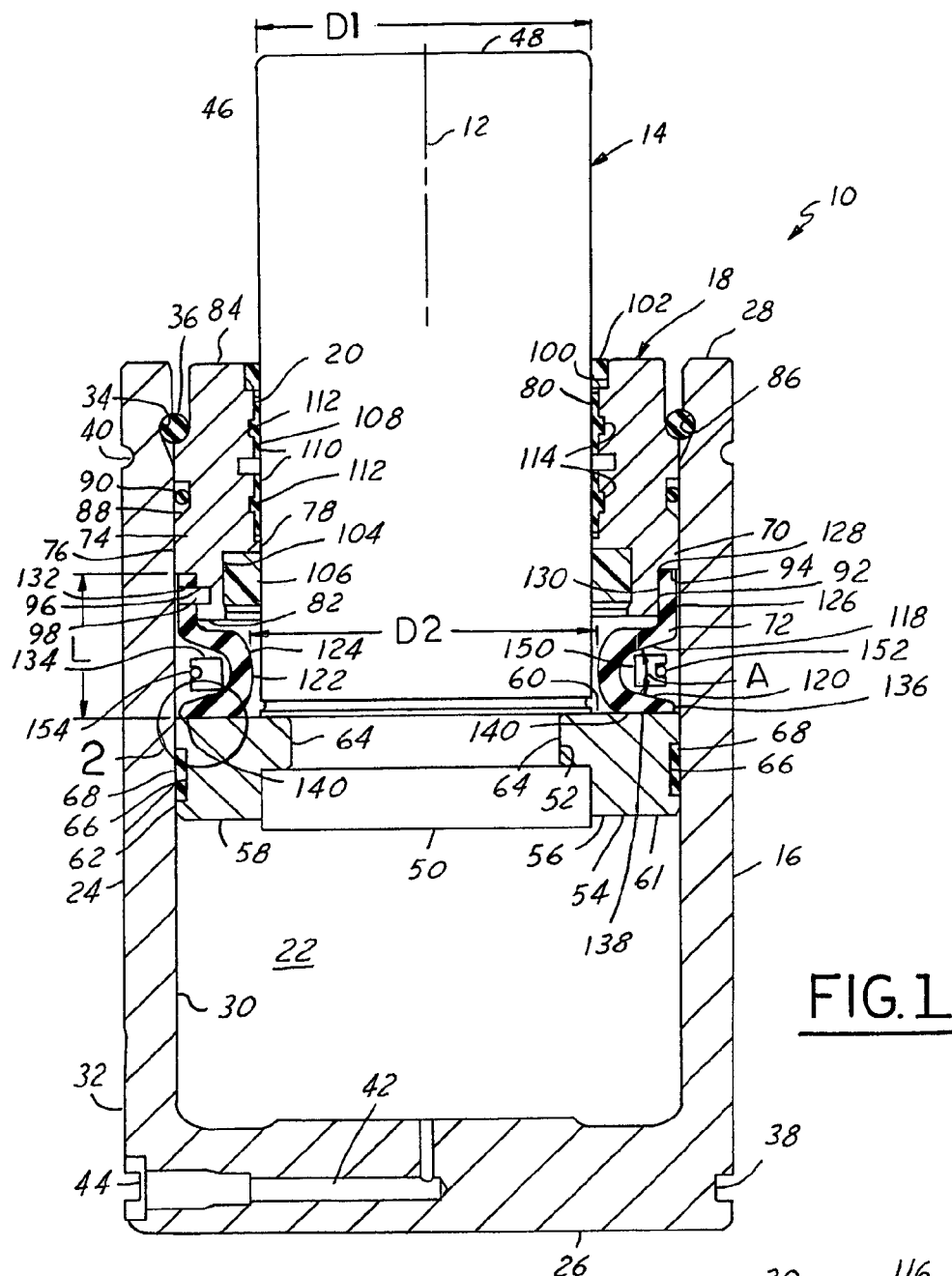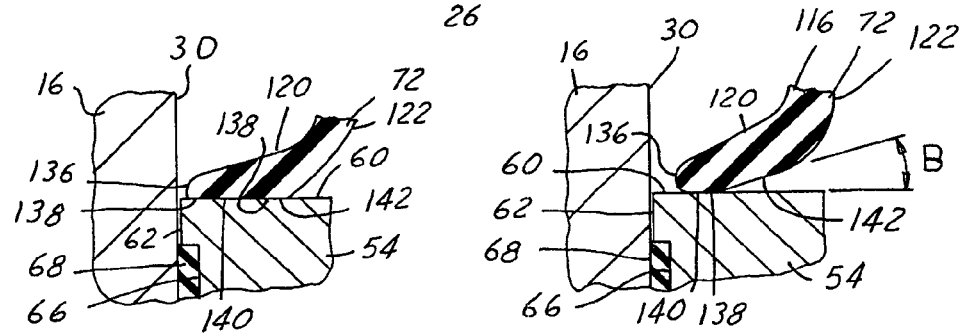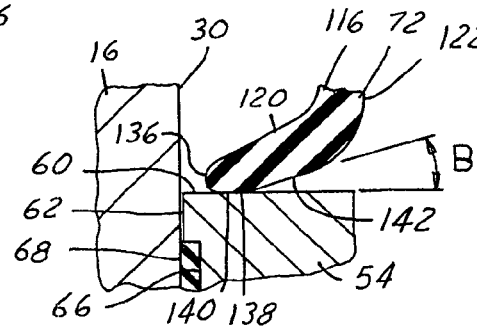

LOW IMPACT GAS SPRING

REFERENCE TO RELATED APPLICATION

Applicant claims the benefit of provisional application, Ser. No. 60/602,777 filed Aug. 19, 2004.

FIELD OF THE INVENTION

This invention relates generally to gas springs, and more particularly to a gas spring constructed to reduce the impact force on a press during at least a portion of the stroke of the gas spring.

BACKGROUND OF THE INVENTION

Gas springs are well known and have been used in dies of presses for sheet metal stamping operations. Conventional gas springs have a gas chamber which receives a pressurized gas that provides a force on a piston and a piston rod of the gas spring to bias them to an extended position. The pressurized gas resists the movement of the piston and the piston rod from their extended position to a retracted position. Various housings and seals are provided in the gas spring to retain the piston and piston rod within a casing of the gas spring and to prevent leakage of the pressurized gas from the gas chamber.

Typically, a plurality of gas springs yieldably urge a binder ring or clamp ring of the die assembly into engagement with a sheet metal work piece as the dies are closed by the press to form the work piece. In presses with mechanical drive mechanisms, the mechanical advantage of the mechanism varies depending on the position of a ram of the press, with the mechanical advantage typically increasing dramatically as the ram approaches a fully advanced or extended position to completely close the dies and form the work piece.

When the ram of the press is in a mid-stroke position, the piston and rod of the gas spring are typically in their fully extended position. The piston and rod are initially moved toward their retracted position before the ram reaches its fully extended position. Consequently, the gas springs initially apply a relatively large force to the drive mechanism of the press relative to the maximum force of the press. In addition, since the mechanical drive mechanism of the press typically has already begun moving and accelerating the ram and the die half attached thereto before it begins to actuate and overcome the resistance produced by the gas springs, the initial impact or actuation of the gas springs creates an impulse or load spike of relatively high magnitude and short duration on the drive mechanism of the drive press. The load spikes can cause an increase in the necessary press maintenance, thereby increasing the maintenance and repair costs of the press. In some instances, the spike loads may damage the drive mechanism of the press, thereby decreasing the useful life of the press.

Similarly, during opening of the closed dies after a work piece has been formed, the gas springs apply a relatively high force or load to the drive mechanism of the press, wherein the force is suddenly terminated when the press is disengaged from the gas springs. As such, the drive mechanism is subjected to further impulse or load spikes that can result in damage to the press or formed part, for example, by causing vibration.

SUMMARY OF THE INVENTION

A gas spring incorporated in a machine, such as a press, for example, provides a smooth and generally gradual load distribution between interrelated parts of the press and gas spring, in use. The gas spring has a casing defining at least in part a gas chamber, a housing disposed at least partially in the casing, and a piston rod assembly received for reciprocation within the casing. The piston rod assembly has a piston retainer movable between a retracted position away from the housing and an extended position in abutment with the housing. The housing flexes between a compressed position when the piston retainer moves to its extended position and abuts the housing and an uncompressed position as the piston retainer moves toward its extended position and out of engagement with the housing. Accordingly, the housing of the gas spring contributes at least in part in providing the smooth and generally gradual load distribution between interrelated parts of the press.

Some potential objects, features and advantages of at least some presently preferred embodiments of this invention include providing a gas spring that requires a reduced force to initially displace a piston rod assembly from its extended position, reduces the impact force on a press when the press initially engages the gas spring, reduces the spike load on the press when the press releases from the gas spring, extends the useful life of the press, reduces the noise of the press and the gas spring in use, is durable, reliable, of relatively simple design, is of economical manufacture and assembly and has a long and useful life in use.

BRIEF DESCRIPTION OF THE DRAWINGS

These and other objects, features and advantages of this invention will become apparent from the following detailed description of the preferred embodiments and best mode, appended claims and accompanying drawings, in which:

FIG. 1 is a cross sectional view of one presently preferred embodiment of a gas spring with a piston rod assembly shown in an extended position;

FIG. 2 is an enlarged fragmentary view of the encircled area 2 of FIG. 1;

FIG. 3 is a view similar to FIG. 2 with the piston rod assembly in a partially retracted position;

DETAILED DESCRIPTION OF THE PREFERRED EMBODIMENTS

Figure 1A:
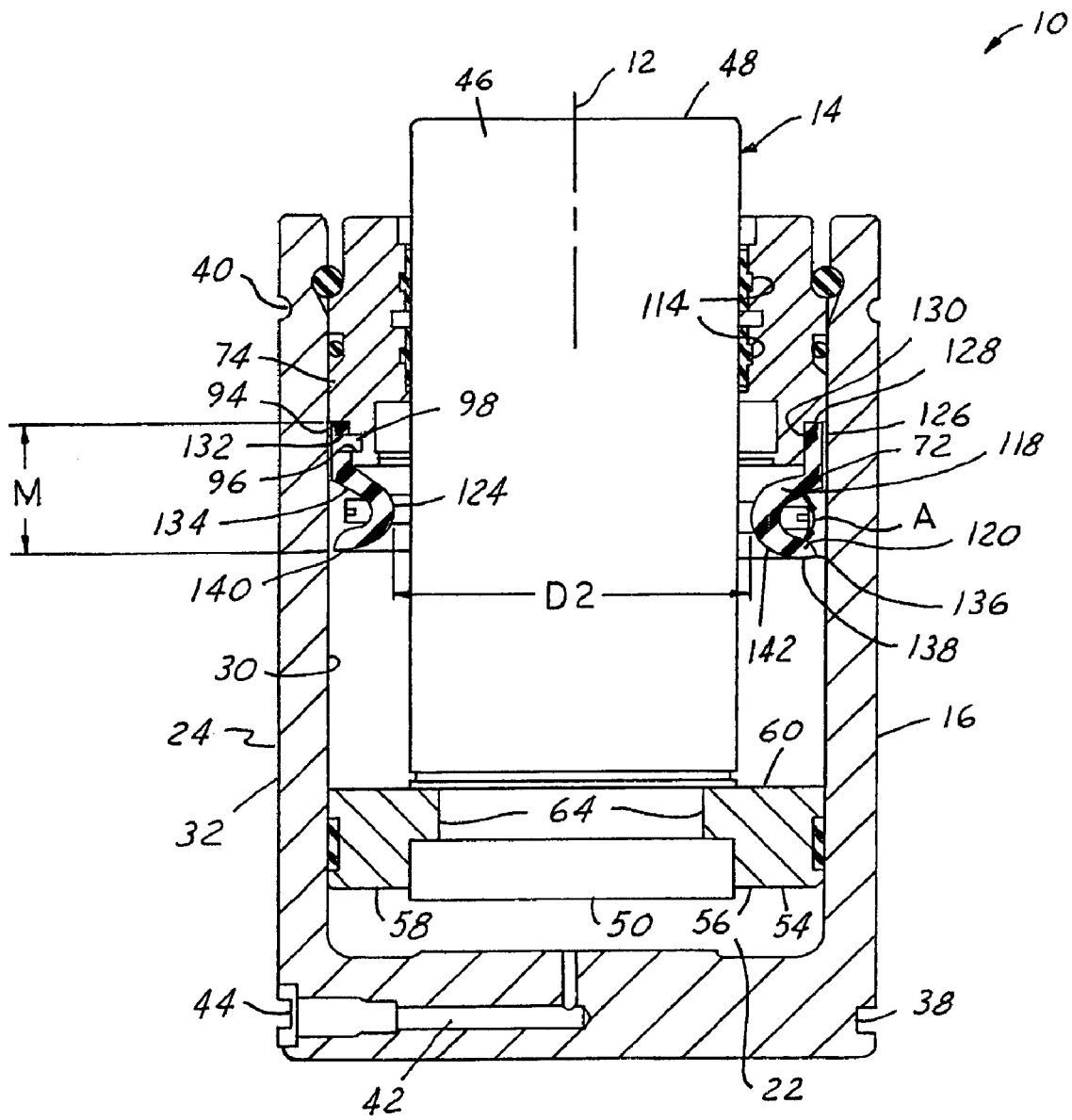
FIG. 1A is a view similar to FIG. 1 with the piston rod assembly in a partially retracted position.

Referring in more detail to the drawings, FIG. 1 illustrates one presently preferred embodiment of a gas spring 10, such as those used in mechanical presses (not shown). Generally, a plurality of gas springs 10 may be disposed in the mechanical press such that a piston rod assembly 14 of each gas spring 10 is engaged and driven by a ram of the press as the ram advances to form a sheet metal blank in a die assembly of the press. The press may be an eccentric, crank or toggle type mechanical press, for example. Desirably, the force applied to the press ram upon initially moving the piston rod assembly 14 from its extended position toward its retracted position, and also when the press ram is disengaging the piston rod assembly 14 on a return stroke, is reduced. Accordingly, the gas spring 10 reduces the impact force on the press, both during the forming and return strokes of the press, and reduces vibration and noise in operation, thereby enhancing the ability to produce a uniform part in the die assembly of the press and reducing the potential for damage to the press and gas springs 10.

The gas spring has a casing 16 with a generally cylindrical wall 24 terminating at one end 26 that is generally closed, and at another end 28 that is substantially open for receiving the piston rod assembly 14 therein. Generally, the closed end 26 is attached, for example through a weld joint, or formed as one piece with the cylindrical wall 24. The wall 24 of the casing 16 has an inner surface 30 defining at least in part a gas chamber 22, and an outer surface 32. The inner surface 30 of the wall 24 has a circumferential retainer groove 34 constructed for receipt of a retainer, shown here by way of example as a snap ring 36, to maintain the gas spring 10 in its assembled state. To facilitate mounting and locating the gas spring 10 within the press, a pair of longitudinally spaced circumferential grooves 38, 40 are formed in the outer surface 32 of the casing 16 adjacent its ends 26, 28.

To admit gas into the gas spring 10, the casing 16 has a passage or fill port 42 extending between the inner and outer surfaces 30, 32 of the wall 24, shown here as extending through the closed end 26 of the casing 16. A fill valve 44 received in the fill port 42 acts as a one way valve and allows gas to be admitted into the gas spring 10, while preventing the gas from unintentionally exiting the gas spring 10. The fill valve 44 preferably may be opened to release pressurized gas from within the gas spring 10, when desired.

The piston rod assembly 14 has a generally elongate piston rod 46 defining a longitudinal axis 12 of the gas spring 10 with one end 48 preferably extending out of the casing 16 and adapted for operable engagement with the ram of the press, and another end 50 received within the casing 16. The piston rod 46 has a generally circumferential groove 52 adjacent to the end 50 to receive an enlarged piston retainer 54 for conjoint movement with the piston rod 46.

The piston retainer 54 preferably has split halves 56, 58 that define a space or gap (not shown) therebetween to allow gas to flow between the halves 56, 58, in use. The piston retainer 54, when carried by the piston rod 46, is generally annular and preferably has a pair of generally opposite flat faces or sides 60, 61 extending radially outward from the piston rod 46 and terminating at a peripheral surface 62 extending generally between the sides 60, 61. Each half 56, 58 of the piston retainer 54 has a generally semi-circular and inwardly extending shoulder 64 constructed to be closely received within the groove 52 of the piston rod 46 to retain the respective halves 56, 58 of the piston retainer 54 on the piston rod 46 in use. To facilitate guiding the piston retainer 54 within the casing 16, desirably the respective halves 56, 58 have a groove 66 extending into the peripheral surface 62 to receive an annular guide bearing 68. The guide bearing 68 is preferably constructed from a composite polymer and is sized to slidably engage the inner surface 30 of the casing 16 to guide the piston rod assembly 14 for axial reciprocation within the casing 16.

As shown in FIG. 1, the gas spring 10 has a housing 18 constructed according to one presently preferred embodiment of the invention with a through bore 20 sized for axial reciprocation of the piston rod 46 therein. The housing 18 has an annular first housing 70 received at least in part in the casing 16 and an annular second housing 72 carried in the housing 18 by the first housing 70. The first housing 70 has a generally annular wall 74 with an outer surface 76 at least partially sized to be closely received adjacent to the inner surface 30 of the casing 16. The wall 74 has an inner surface 78 defining at least in part a through bore 80 having a first diameter D1 sized to receive the piston rod 46 for relative axial movement or reciprocation therein. The first housing 70 has generally opposite ends 82, 84, with one end 82 being received in the casing 16 upon assembly of the first housing 70 at least partially in the casing 16. To facilitate attachment of the first housing 70 within the casing 16, desirably the first housing 70 has a generally circumferential groove 86 arranged to receive the snap ring 36 also received in the groove 34 of the casing 16. To further facilitate a gas-tight seal between the first housing 70 and the casing 16, a generally circumferential seal groove 88 is constructed in the outer surface 76 of the first housing 70 for receipt of a seal 90. The seal 90 is shown here as an o-ring compressed between the seal groove 88 and the inner surface 30 of the casing 16. Desirably, the outer surface 76 of the first housing 70 has a necked down or reduced diameter portion 92 concentrically arranged with the outer surface 76 and adjacent to the end 82. The reduced diameter portion 92 defines a radially extending annular shoulder 94. To facilitate attaching the second housing 72 to the first housing 70, preferably, at least one pocket 96 sized for receipt of a setscrew, pin 98, or the like, extends radially inwardly into the reduced diameter portion 92.

The first housing 70 has a circumferential wiper groove 100 extending radially outwardly from the through bore 80 adjacent its end 84 for maintaining a wiper 102 therein. The wiper 102 engages the piston rod 46 to prevent contamination or debris from entering the gas spring 10 between the first housing 70 and the piston rod 46. The first housing 70 also has a generally circumferential seal groove 104 extending radially outwardly from the through bore 80 adjacent its other end 82. The seal groove 104 is adapted to receive a rod seal 106 that sealingly engages the piston rod 46 to prevent gas from within the gas spring 10 from leaking out of the gas spring 10 between the piston rod 46 and the first housing 70. The first housing 70 preferably has a generally annular recess 108 extending radially inwardly from the inner surface 78. The recess 108 is generally sized to receive at least one and preferably a pair of axially spaced plain or journal bearings 110, represented here as composite polymer journal bearings. To facilitate maintaining the bearings 110 in their intended locations, desirably a pair of axially spaced, generally circumferential grooves 112 are constructed in the recess 108 to receive radially outwardly extending ribs 114 on the respective bearings 110. It is contemplated that the pair of bearings 110 may incorporate a spacer therebetween, or otherwise could be constructed as a single bearing or more than two bearings (not shown). The increased bearing area presented by the pair of bearings 110 enhances the performance of the gas spring 10 by improving the running alignment of the piston rod assembly 14 within the casing 16. Accordingly, the life and efficiency of the gas spring 10 is increased.

The second housing 72, as constructed according to one presently preferred embodiment, has a generally U-shaped wall 116 in axial cross section. The wall 116 is defined at least in part by a pair of legs 118, 120 extending radially outwardly from an intermediate wall or bight 122 joining the two legs 118, 120 to one another and defining a through bore 124. The wall 116 is preferably spaced radially outwardly from the piston rod 46 so that the through bore 124 of the second housing 72 is preferably sized for clearance with the piston rod 46 through the full travel of the piston rod 46 between its extended and retracted positions. Thus, the second housing 72 can move freely between its compressed position (FIG. 1) and uncompressed position (FIG. 1A). To facilitate the movement between its compressed and uncompressed positions, and to prevent interference between the bight 122 and the piston rod 46, the through bore 124 defined by the bight 122 preferably has a second diameter D2 that is greater than the first diameter D1 of the through bore 80 in the first housing 70.

The second housing 72 has an annular wall 126 that extends axially from one of the legs 118 away from the piston retainer 54 to define one end 128 of the second housing 72. The wall 126 has an inner surface 130 received around the reduced diameter portion 92 of the first housing 70. The inner surface 130 preferably is sized for a friction or press fit about the reduced diameter portion 92, and desirably extends axially to abut the shoulder 94 of the first housing. To facilitate maintaining and locking the second housing 72 to the first housing 70, preferably a corresponding number of through holes 132 are formed in the wall 126 as there are pockets 96 in the first housing 70, and when aligned, pins 98 preferably are inserted partially through the holes 132 and into the pockets 96. The pins 98 and associated holes 132 and pockets 96 are presently preferred but not necessary. The pins 98 may be received by a friction fit or they can be formed having internal threads for threaded engagement with externally threaded set screws, by way of examples without limitation.

As best shown in FIG. 1A, when the piston rod assembly 14 is moved out of compressing engagement with the second housing 72, the legs 118, 120 are preferably inclined relative to one another and diverge radially outwardly from one another to define an annular channel 134 opening radially outwardly and having an included angle (A) generally about 10-45 degrees, and preferably about 20-40 degrees. The leg 120 extending toward the piston retainer 54 defines a circumferentially continuous lip 136 and a lower surface 138 that defines an end 140 of the second housing 72. To enhance the strength and durability of the lip 136, preferably a portion of the lower surface 138 generally adjacent the lip 136 has a surface generally perpendicular to the axis 12 while in the relaxed position. As such, when the piston retainer 54 initially engages the leg 120 (FIG. 3), an increased contact area exists between the mating parts. Preferably, the lower surface 138 of the leg 120 adjacent the lip 136 has at least a portion 142 that is inclined relative to the longitudinal axis 12 (FIG. 1A) and the side 60 of the piston retainer 54 head that engages the second housing 72. Generally, the inclined portion 142 extends radially inwardly at an angle (B) (FIG. 3) from a horizontal plane defined by the side 60 of the piston retainer 54. The angle (B) is preferably between about 2½-30 degrees. As shown in FIGS. 1 and 2, when the piston retainer 54 is fully engaged with the leg 120, the second housing 72 is in its fully compressed position so that the inclined portion 142 of the lip 136 is axially compressed into abutting contact with the side 60 of the piston retainer 54. As such, when the second housing is in its compressed position (FIG. 1), the ends 128, 140 define a first distance (L) and when in its uncompressed position (FIG. 1A), the ends 128, 140 define a second distance (M), wherein the first distance (L) is less than the second distance (M).

Figure 4:
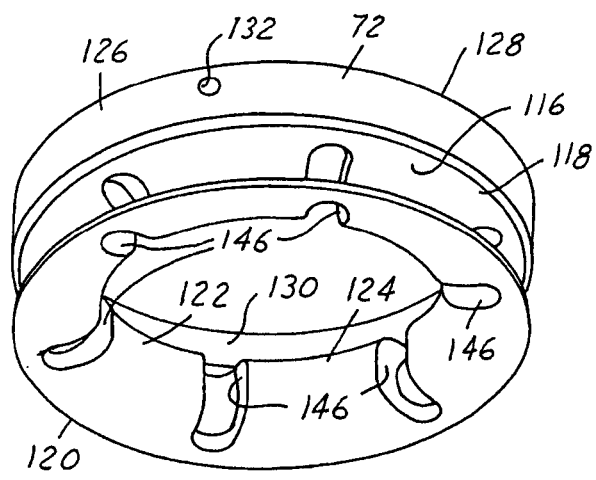
FIG. 4 is a perspective view of a rear housing of the gas spring of FIG. 1.

As shown in FIG. 4, to reduce the circumferential or hoop stresses throughout the wall 126 of the second housing 72 as the wall 116 moves between its compressed and decompressed positions, desirably bight 122 has a plurality of circumferentially spaced slots 146. The slots 146 extend generally radially into at least one and preferably both the legs 118, 120, thereby allowing the second housing 72 to flex axially and radially with minimal circumferential stresses being generated throughout the second housing 72.

Optionally, a split spacer 150 may be received in the channel 134 defined between the legs 118, 120. The spacer 150 is desirably constructed from split halves of material, such as aluminum, low grade carbon-steel, by way of examples without limitation, preferably having an outer circumferential groove 152 sized for receipt of an o-ring 154. The o-ring 154 generally acts to keep the spacer halves 150 within the channel 134 throughout the assembly process. The spacer 150 acts to absorb or cushion the impact of the piston rod assembly 14 with the second housing 72, if the second housing 72 is damaged. The spacer 150 may be used if the gas spring life exceeds the fatigue life of housing 72.

With the piston rod assembly 14 received in the casing 16, and the housing 18 maintained within the casing 16 by the snap ring 36, the gas spring 10 may be charged with gas through the fill port 42. The pressurized gas yieldably biases the piston rod assembly 14 to its extended position wherein the piston retainer 54 engages and compresses the second housing 72 which exerts a spring force on the piston retainer 54. The spring rate can be altered by changing the specific configuration of the legs, as desired. The effective spring force in use is equal to the net force on the piston from the pressurized gas, and in some applications may be on the order of about 10,000-25,000 pounds. Preferably, the deflection of the second housing is maximized for a given gas force on the piston without causing any yielding failure or permanent deformation of the second housing. In one presently preferred implementation, the second housing deflects about 0.02 of an inch at 17000 lbs.

Typically, a plurality of charged gas springs 10 are received in a die assembly with a work piece clamp ring or binder ring resting on the ends 48 of the extended piston rods 46. The die assembly is received in a press with one die attached to a bed of the press, while another die is attached to the ram of the press. As the ram is advanced from its fully retracted position, the clamp ring is urged by the gas springs 10 into engagement with a metal blank to be formed. The piston rods 46 of the gas springs 10 are initially retracted under the ram force as the dies are moved toward their fully closed position to form or stamp the blank into a formed part. As such, as the press ram initially engages the blank, the impact force on the press ram is reduced as a result of the assistance from the spring force exerted by the legs 118, 120 on the piston retainer 54. In addition, as the dies are moved toward their open position, the impact force to the press is reduced by the gradual loading of the legs 118, 120 as they become compressed by the piston retainer 54. As such, the load imparted on the press takes place over a smooth load curve, rather than a sudden spike. The reduced impact force upon the press and its associated components over a complete stroke of the press reduces the wear, damage, noise and vibration within the gas spring 10 and press assembly.

Figure 5:
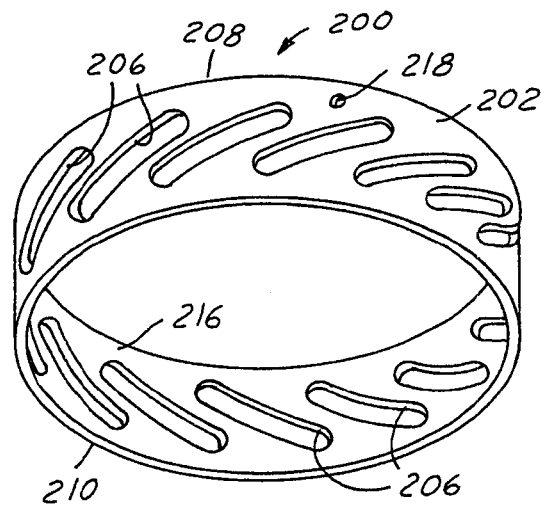
FIG. 5 is a perspective view of a rear housing constructed according to another embodiment of the invention.
Figure 6:
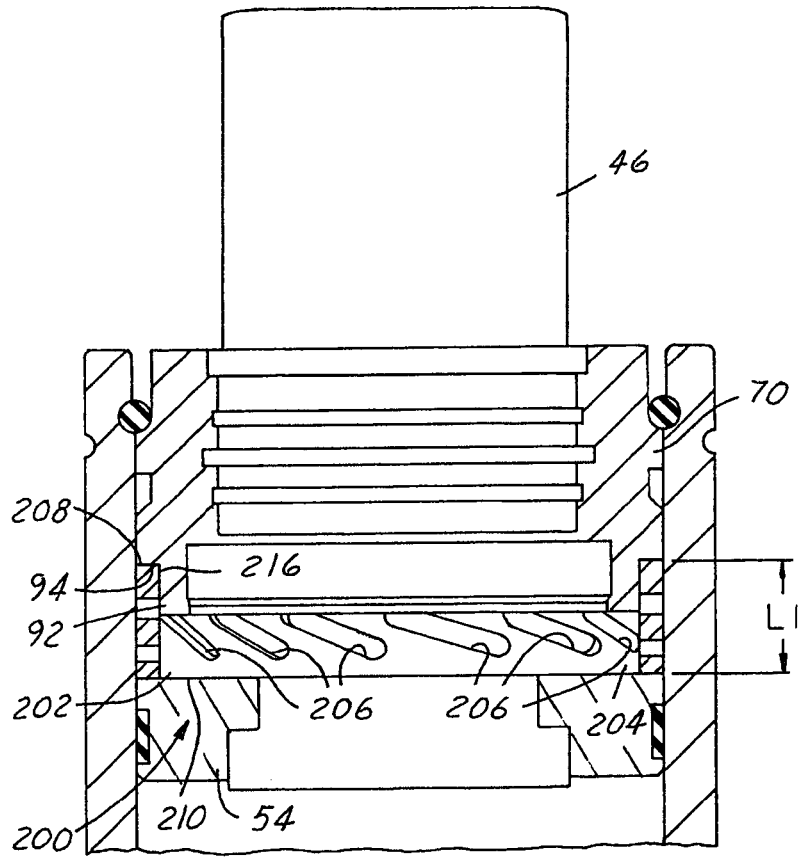
FIG. 6 is a fragmentary cross sectional view of a gas spring including the rear housing of FIG. 5.
Figure 7:
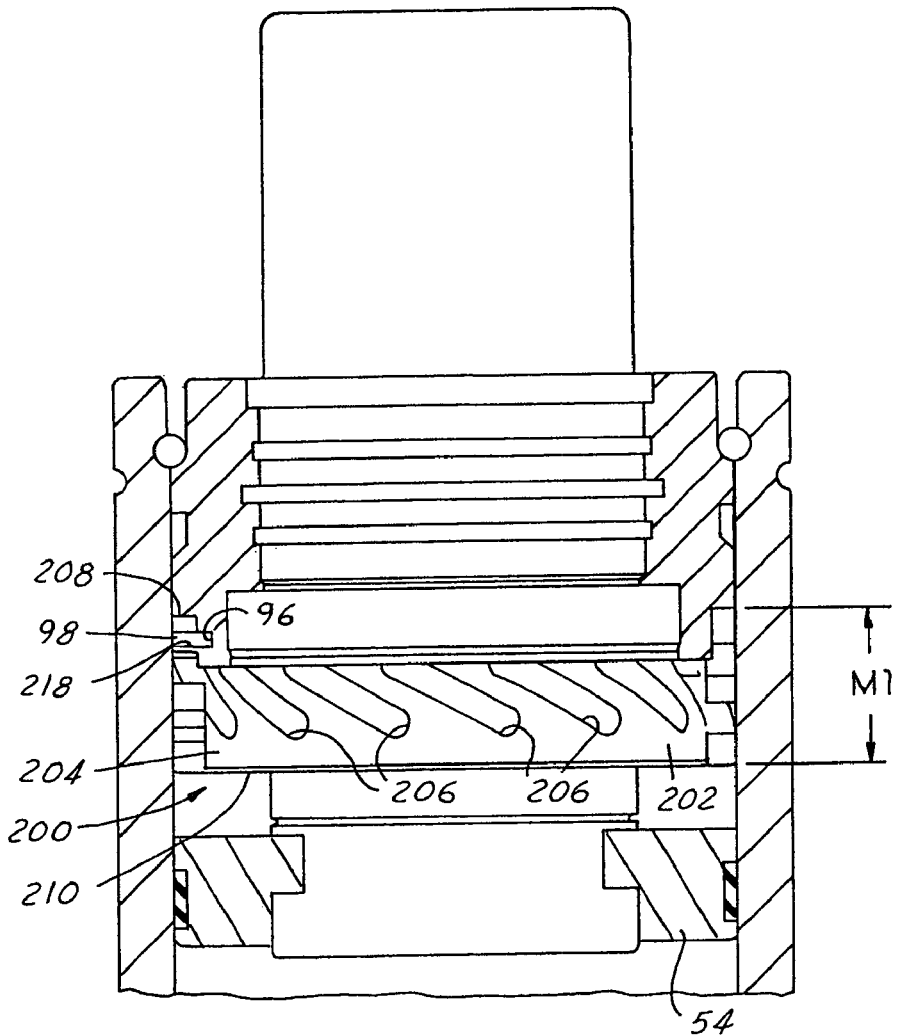
FIG. 7 is a view similar to FIG. 6 with a piston rod assembly in a partially retracted position.

As shown in FIGS. 5-7, a second housing 200, as constructed according to another presently preferred embodiment, has a generally cylindrical wall 202 with a through bore 204 sized for clearance with the piston rod 46 in use. The second housing 200 has at least one and preferably a plurality of slots 206 extending through the wall 202 and desirably bounded or enclosed by generally opposite upper and lower ends 208, 210 of the wall 202 so that the wall 202 is axially compressible. The wall 202 and slots 206 can be configured as desired to achieve the desired spring force, compressibility and durability for the intended application. The slots 206 are shown here as being helically arranged relative to one another with an angle of inclination relative to the upper and lower ends 208, 210 of about 20-45 degrees. For a given number of slots, the greater the angle of slot inclination relative to the upper and lower ends 208, 210, the more stiff the second housing 200 generally becomes.

The wall 202 has an inner surface 216 preferably sized for a friction or press fit about the reduced diameter portion 92 of the first housing 70. Preferably, to facilitate locating the second housing 200 axially relative to the first housing 70, the end 208 extends axially to abut the shoulder 94 of the first housing 70. To facilitate maintaining and locking the second housing 200 to the first housing 70, preferably a corresponding number of through holes 218 are formed in the wall 202 and are arranged for alignment with the pockets 96 in the first housing 70. The through holes 218 are preferably sized to receive the pins 98, such as by a friction fit or threaded engagement, for example.

In use, the second housing 200 moves between a compressed position (FIG. 6) when the piston rod assembly 14 is in its extended position, and an uncompressed position (FIG. 7) when the piston rod assembly 14 is moved sufficiently toward its retracted position to disengage the piston retainer 54 from the end 210. As such, when the second housing 200 is in its compressed position (FIG. 6), the ends 208, 210 define a first distance (L1) and when in its uncompressed position (FIG. 7), the ends 208, 210 define a second distance (M1), wherein the first distance (L1) is less than the second distance (M1). As the second housing 200 moves between its compressed and uncompressed positions, generally at least a portion of the wall 202 moves with some degree of twisting movement due to the helically formed slots 206 becoming compressed and uncompressed. Otherwise, the second housing 200 functions to reduce the impact loads on the press ram and its associated components, as described in the previous embodiment, and thus, is not described in further detail.

Figure 8A:
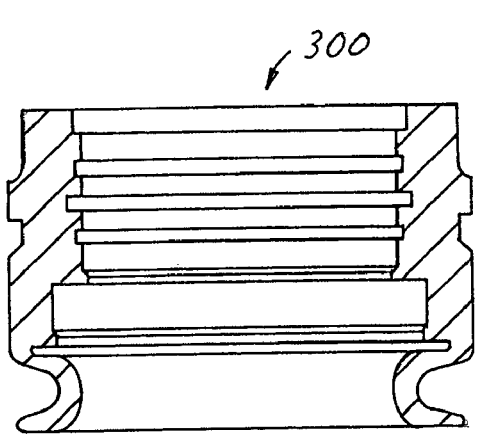
FIGS. 8A and 8B are cross sectional views of another presently preferred embodiment of a first and second housing constructed as a single piece of material.
Figure 8B:
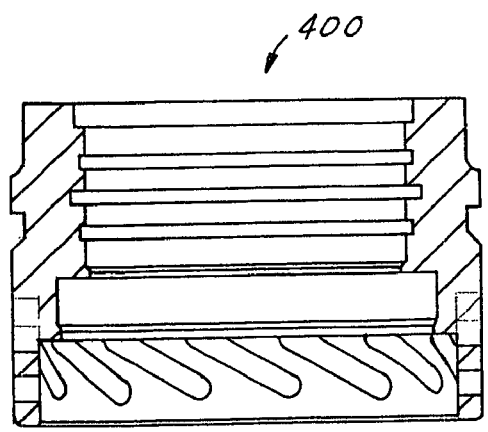

It should be recognized that one ordinarily skilled in the art will recognize other embodiments encompassed within the scope of this invention. For example, it is contemplated to be within the scope of this invention to construct the first housing 70 as one piece with the respective second housings 72, 200 to form respective housings 300 and 400, as shown generally in FIGS. 8A and 8B. The second housing 200 can be formed and arranged in other ways to provide a spring force or offsetting force as generally set forth herein. In addition, it is contemplated that various metallic and polymeric materials may be used for the first housing 70 and the second housings 72, 200, as necessary to achieve the desired performance characteristics. The embodiments described above are intended to be illustrative and not limiting. The scope of the invention is defined by the claims that follow.

The invention claimed is:

1. A gas spring, comprising:
a casing defining in part a gas chamber;
a piston rod assembly having a piston rod received at least partially in the casing for reciprocation between extended and retracted positions, and a piston head carried by the piston rod;
a housing at least partially received in the casing and having a through bore sized to receive said piston rod for relative movement therein as said piston rod assembly reciprocates between its extended and retracted positions; and
an annular ring carried by the housing, encircling the piston rod, having a generally U-shaped cross section with a pair of axially spaced apart legs and an interconnecting bight portion with the legs extending circumferentially and generally radially and inclined relative to one another so that at least one of the radial legs flexes between an axially compressed position when said piston head is in its fully extended position and engaged with one of the legs of the annular ring to apply a force to the piston head and an uncompressed position as said piston rod moves toward its retracted position and the piston head is out of engagement with the annular ring and it does not apply force to the piston head, and the maximum axial distance between the radial legs is less in the compressed position than in the uncompressed position.

2. The gas spring of claim 1 wherein the annular ring is constructed separately from the housing and has one end facing said piston head and another end facing away from said piston head.

3. A gas spring, comprising:
a casing defining in part a gas chamber;
a piston rod assembly having a piston rod received at least partially in the casing for reciprocation between extended and retracted positions, and a piston retainer carried by the piston rod;
a first housing at least partially received in the casing and having a through bore sized to receive said piston rod for relative movement therein as said piston rod assembly reciprocates between its extended and retracted positions;
a second housing carried by the first housing and having one end facing said piston retainer and another end facing away from said piston retainer;
a circumferentially extending leg defining an end of the second housing received in said casing, facing said piston retainer and flexing between a compressed position when said piston retainer is in its extended position and abuts said leg and an uncompressed position as said piston rod assembly moves toward its retracted position and out of engagement with said leg so that the maximum axial distance between the legs is less in the compressed position than in the uncompressed position; and
said first housing having an outer surface and a reduced diameter portion with a shoulder being defined between said reduced diameter portion and said outer surface, and said second housing having an annular wall sized for receipt about said reduced diameter portion.

4. The gas spring of claim 3 wherein said annular wall defines one end of the second housing, said one end of the second housing abutting said shoulder when said first and second housings are attached to one another.

5. A gas spring, comprising:
a casing defining in part a gas chamber;
a piston rod assembly having a piston rod received at least partially in the casing for reciprocation between extended and retracted positions, and a piston head carried by the piston rod;
a housing at least partially received in the casing and having a through bore sized to receive said piston rod for relative movement therein as said piston rod assembly reciprocates between its extended and retracted positions;
an annular ring carried by the housing, encircling the piston rod, having a generally U-shaped cross section with a pair of axially spaced apart legs and an interconnecting bight portion with the lees extending circumferentially and generally radially and inclined relative to one another so that at least one of the radial legs flexes between an axially compressed position when said piston head is in its extended position and abuts the annular ring to apply a force to the piston head and an uncompressed position as said piston rod moves toward its retracted position and the piston head is out of engagement with the annular ring so that it does not apply force to the piston head and the maximum axial distance between the radial legs is less in the compressed position than in the uncompressed position;

said annular ring is constructed separately from the housing and has one end facing said piston head and another end facing away from said piston head; and said housing has a reduced diameter portion with a pocket extending radially inwardly therein, said ring has an annular wall sized for receipt about said reduced diameter portion and having a through hole arranged for alignment with said pocket, and further comprising a pin sized for receipt in said through hole and in said pocket to facilitate locking said ring and housing in attached relation to one another.

6. The gas spring of claim 1 wherein said legs define in part an annular channel and further comprising an annular cushion sized for and received in said channel.

7. The gas spring of claim 1 wherein said housing has a longitudinal axis and the leg adjacent the piston head has a portion inclined relative to said axis and away from said piston head to facilitate movement of said leg between the compressed and uncompressed positions of the annular ring.

8. A gas spring, comprising:
a casing defining in part a gas chamber;
a piston rod assembly having a piston rod received at least partially in the casing for reciprocation between extended and retracted positions, and a piston head carried by the piston rod;
an annular first housing received at least in part in said casing and having a through bore sized to receive said piston rod for relative axial movement therein as said piston rod assembly reciprocates between its extended and retracted positions; and
an annular second housing carried in said casing by said first housing, said second housing having a generally U-shaped wall defined in part by a pair of legs axially spaced apart, extending generally radially and inclined relative to each other and at least one of said legs is adapted to flex between an axially compressed position when said piston head engages one of said legs and is in its fully extended position and an uncompressed position as said piston rod moves toward its retracted position and out of engagement with said at least one of said legs so that the maximum axial distance between the legs is less in the compressed position than in the uncompressed position.

9. The gas spring of claim 8 wherein said first housing has an outer surface and a reduced diameter portion with a shoulder being defined between said reduced diameter portion and said outer surface, said second housing having an annular wall extending axially from one of said legs with said annular wall being sized for receipt about said reduced diameter portion.

10. The gas spring of claim 8 wherein said U-shaped wall is spaced radially outwardly from said piston rod.

11. A gas spring, comprising:
a casing defining in part a gas chamber;
a piston rod assembly having a piston rod received at least partially in the casing for reciprocation between extended and retracted positions, and a piston retainer carried by the piston rod;
an annular first housing received at least in part in said casing and having a through bore sized to receive said piston rod for relative axial movement therein as said piston rod assembly reciprocates between its extended and retracted positions;
an annular second housing in said casing and carried by said first housing, said second housing having a generally U-shaped wall defined in part by a pair of legs, at least one of said legs adapted to flex between a compressed position when said piston retainer abuts one of said legs and an uncompressed position as said piston rod assembly moves toward its retracted position and out of engagement with said at least one of said legs; and
said U-shaped wall defines a through bore sized for receipt of said piston rod, said U-shaped wall having a plurality of circumferentially spaced slots through at least one of said legs.

12. The gas spring of claim 11 wherein said through bore of said first housing has a first diameter and said through bore of said second housing has a second diameter, said second diameter being greater than said first diameter.

13. The gas spring of claim 8 wherein said piston head has an upper surface and said at least one of said legs has a surface inclined relative to said upper surface to facilitate movement of said at least one of said legs between its compressed and uncompressed positions.

14. The gas spring of claim 11 wherein said legs define at least in part an annular channel and further comprising an annular cushion sized for receipt in said channel.

15. The gas spring of claim 14 wherein said cushion has a peripheral groove and further comprising an 0-ring sized for receipt in said peripheral groove to facilitate maintaining said cushion in said channel.

16. A gas spring, comprising;
a casing defining in part a gas chamber;
a piston rod assembly having a piston rod received at least partially in the casing for reciprocation between extended and retracted positions, and a piston head carried by the piston rod;
an annular first housing received at least in part in said casing and having a through bore sized to receive said piston rod for relative axial movement therein as said piston rod assembly reciprocates between its extended and retracted positions;
an annular second housing in said casing and carried by said first housing, said second housing having a generally U-shaped wall defined in part by a pair of legs, at least one of said legs adapted to flex between a compressed position when said piston head abuts one of said legs and an uncompressed position as said piston rod moves toward its retracted position and out of engagement with said at least one of said legs; and
said first housing and said second housing are constructed as a single piece of material.

17. A gas spring, comprising:
a casing defining in part a gas chamber;
a piston rod assembly having a piston rod received at least partially in the casing for reciprocation between extended and retracted positions, and a piston head carried by the piston rod;
a housing received at least in part in the casing and having a through bore sized to receive said piston rod for relative movement between the extended position wherein the piston head engages the housing and the retracted position wherein the piston head is spaced from the housing; and
a compressible wall carried by the housing, encircling the piston rod, spaced from the rod to provide radial clearance between the rod and the wall and having a plurality of circumferentially spaced apart slots through the wall, the wall having opposed ends and the wall flexing to a first distance between the ends when the piston rod is in its extended position and to a second distance between the ends when the piston rod is in its retracted position spaced from the wall, the first distance being less than the second distance.

18. The gas spring of claim 17 wherein the compressible wall is a generally U-shaped wall defined in part by a pair of legs, at least one of said legs adapted to flex between a compressed position when the piston rod is in its extended position and an uncompressed position when the piston rod is in its retracted position.

19. The gas spring of claim 18 wherein said piston head has an upper surface and said at least one of said legs has a surface inclined relative to said upper surface to facilitate movement of said at least one of said legs between its compressed and uncompressed positions.

20. The gas spring of claim 17 wherein the housing has a wall at least one slot extending therethrough.

21. The gas spring of claim 20 wherein the housing has opposite ends with said at least one slot being bounded by said opposite ends.

22. The gas spring of claim 21 wherein said housing has a plurality of slots.

23. The gas spring of claim 21 wherein said at least one slot is inclined between 20 and 45 degrees relative to said opposite ends.

24. The gas spring of claim 20 wherein said housing has a plurality of slots helically arranged relative to one another.

* * * * *

UNITED STATES PATENT AND TRADEMARK OFFICE
CERTIFICATE OF CORRECTION

PATENT NO. : 7,559,542 B2 Page 1 of 1
APPLICATION NO. : 11/112645
DATED : July 14, 2009
INVENTOR(S) : Jonathan P. Cotter It is certified that error appears in the above-identified patent and that said Letters Patent is hereby corrected as shown below:

Column 8 Claim 5
  Line 59, delete "lees" and insert -- legs --.

Signed and Sealed this

Eighth Day of September, 2009

David J. Kappos
*Director of the United States Patent and Trademark Office*